W. P. COSPER & W. J. O. JOHNSON.
CONTROLLER REGULATOR.
APPLICATION FILED DEC. 21, 1907.

915,720.

Patented Mar. 16, 1909.
4 SHEETS—SHEET 1.

UNITED STATES PATENT OFFICE.

WILLIAM P. COSPER AND WALTER J O. JOHNSON, OF CHICAGO, ILLINOIS, ASSIGNORS, BY DIRECT AND MESNE ASSIGNMENTS, TO LORD ELECTRIC COMPANY, OF BOSTON, MASSACHUSETTS, A CORPORATION OF MASSACHUSETTS.

CONTROLLER-REGULATOR.

No. 915,720.　　　Specification of Letters Patent.　　Patented March 16, 1909.

Application filed December 21, 1907. Serial No. 407,567.

*To all whom it may concern:*

Be it known that we, WILLIAM P. COSPER and WALTER J. O. JOHNSON, citizens of the United States, and residents of Chicago, Cook county, Illinois, have invented certain new and useful Improvements in Controller-Regulators; and we do hereby declare that the following is a full, clear, and exact description of the same, reference being had to the accompanying drawings, and to the characters of reference marked thereon, which form a part of this specification.

Heretofore various devices for regulating and delivering electrical current to street car motors have been devised and attempts have been made with a view to preventing the operator from turning the current on so rapidly as to endanger the motor or mechanisms driven or actuated thereby. Such devices in the past have been more or less imperfect and have proven ineffective to prevent the operator turning on the current so rapidly as to be very objectionable inasmuch as the operator with a little practice finds it possible to eliminate the regulation of such devices.

Of course, it is very important to enable the current to be instantly turned off the motor independently of any of the regulating devices, used to retard the turning on of the current, and it is also most important to enable the full current to be delivered to the motor if desired in reversing, inasmuch as it sometimes happens that the brakes may be insufficient to stop the car quickly enough to avoid accident, without assisting by reversing the motor. Heretofore devices of this class if effective in retarding the turning on the current to move ahead were as effective in retarding the turning on the current in emergencies in reversing and in consequence precluded effective quick action on the part of the motorman in reversing to avoid accident in emergency.

The object of this invention is to provide a regulator for electrical controllers by the use of which the current can be increased on the motor no more rapidly than the predetermined rate for which the regulator is constructed and by the use of which it is absolutely impossible for any operator to turn on maximum current until the regulator has operated to permit only gradual increase of current delivered to the motor.

It is also an object of the invention to provide a regulator which enables the current to be instantly turned off.

It is a further and very important object of the invention to afford mechanism that is inoperative when turning on the current to drive ahead or when turning off the current but which instantly becomes operative when reversing, to permit the full current to be instantly delivered to the motor if desired, thereby enabling the reverse to operate as an instantaneously applicable brake of great power should occasion ever arise.

It is a further object of this invention to provide a mechanism for the purpose described wherein a stationary element is provided with an oscillating pawl and wherein a rotatable element in the regulator is provided with a tortuous passage through which said oscillating pawl swings a plurality of times before the maximum current can be applied in driving the motor ahead.

The invention comprises many novel features and consists in the matters hereinafter described and more fully pointed out and defined in the appended claims.

In said drawings: A indicates the controller cap, through which protrudes the controller shaft A' and also the reverse shaft $A^2$, the latter adapted to be engaged by the reverse handle in adjusting the controller to deliver the current to the motor to drive ahead, or to reverse, as is usual. Bolted on the controller cap, with the controller shaft $A^2$ protruding centrally therethrough, is the base B, of the regulator. This is, as shown, circular in form and provided on diametrically opposite sides with lugs $b'—b'$ which are slotted concentrically with the base to receive bolts therethrough whereby the base is connected with the controller cap. As shown, pivotally engaged on the lug $b'$, are templet plates $b^2$, adapted to engage between said lug $b'$ and the lug $a$ integral with the top of the controller cap A to enable said base to be adjusted accurately with reference to the mechanism of the controller. As shown, the main portion of said base is circular and concentric with the controller shaft A' and a peripheral flange $b^3$ extends around the base and as shown, is rabbeted on the outer side to permit the rotatable element or regulator cap D to fit downwardly thereover.

Figures 8, 9, 10, 15:
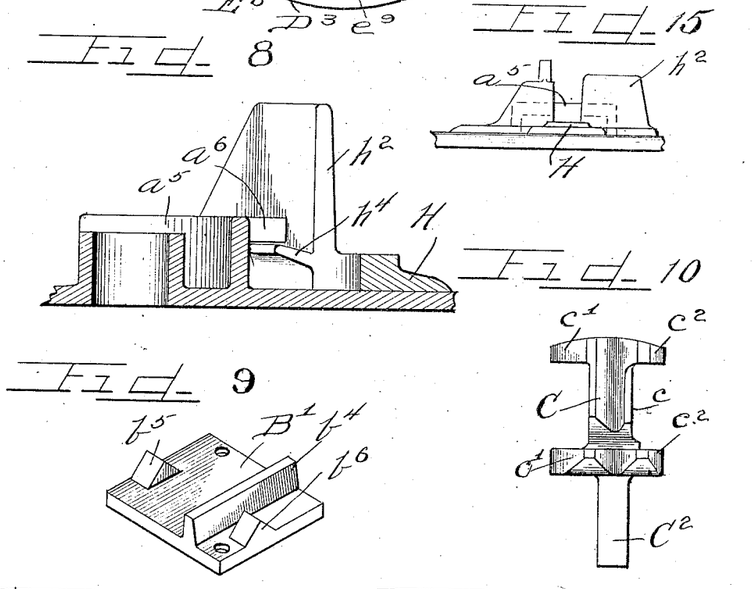
Fig. 8 is an enlarged section taken on line 8—8 of Fig. 2.
Fig. 9 is a top plan view of the pivot plate for the oscillating pawl or pendulum.
Fig. 10 is an enlarged bottom plan view of the oscillating pawl or pendulum.
Fig. 15 is a view in elevation of the end of the locking lever.
Figures 13, 14:
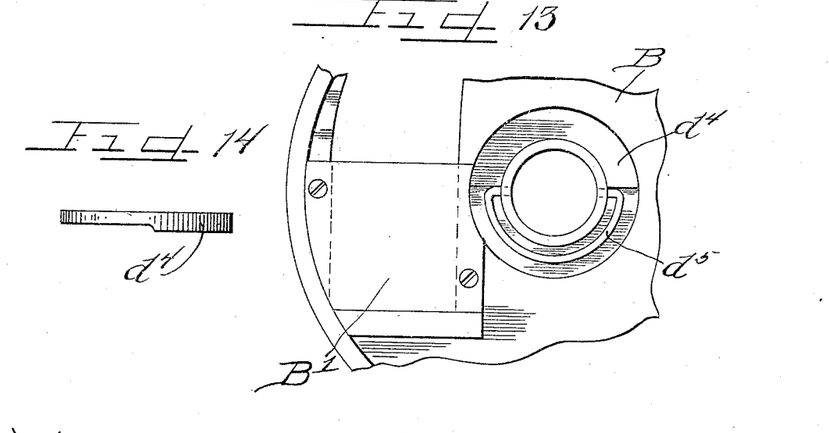
Fig. 13 is an enlarged fragmentary bottom plan view of the base of the regulator.
Fig. 14 is an enlarged edge view of the washer shown in Figs. 6, 12, and 13.

As shown, a comparatively long and broad slot is afforded through the base near the periphery and lying approximately on a chord of the circle of the base. Seated therein at the bottom and closing the forward end of said aperture is a pivot plate B' as shown in Figs. 9 and 13, which is rectangular in form, and is screwed to said base on the under side thereof. Said pivot plate, as shown, is provided near its rear end with a relatively straight rib which lies approximately on a radius of the base. At the ends of the plate on each side of the rib $b^4$ are provided upwardly projecting V shaped ribs $b^5—b^6$, the same being in alinement and directed approximately at right angles with the rib $b^4$.

Figure 3:
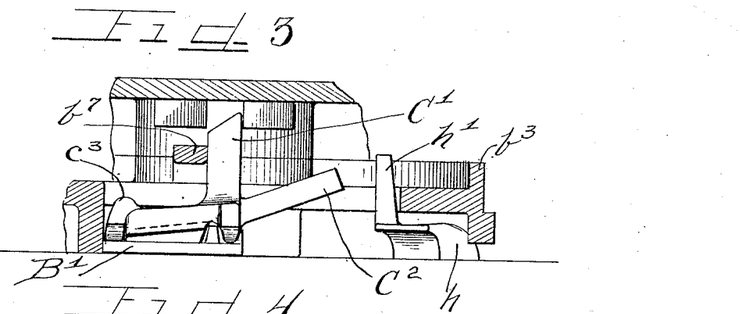
Fig. 3 is an enlarged fragmentary section taken on line 3—3 of Fig. 2 with the pawl in elevation.
Figure 4:
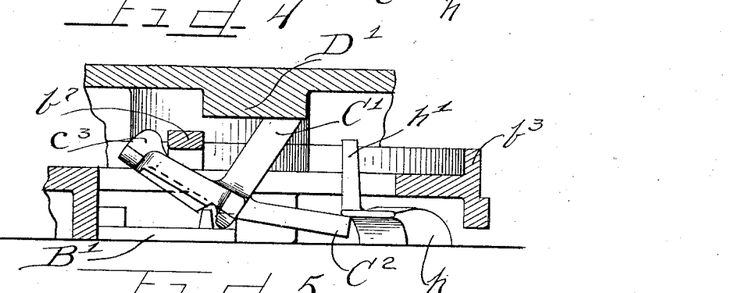
Fig. 4 is a similar view showing the position of parts with current turned off and with the reverse lever at neutral.
Figure 5:
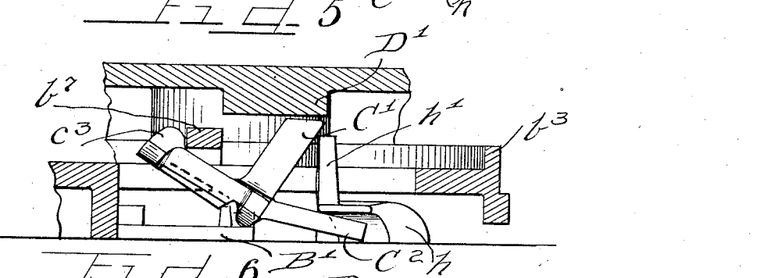
Fig. 5 is a similar view with the reverse lever swung to reverse position and the detent held out of engagement with the rotatable element of the regulator.
Figure 6:
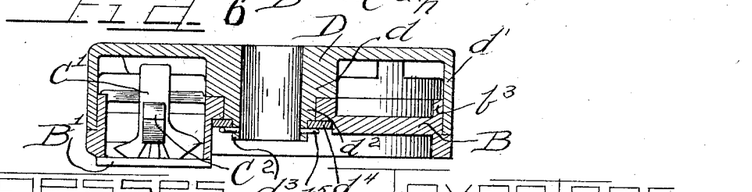
Fig. 6 is an enlarged section taken on line 6—6 of Fig. 2 with the pawl in elevation.

Pivoted upon the pivot plate B' and projecting upwardly for engagement with projections upon the rotatable cover D, is the pawl, pendulum or detent C. This, as shown, in Figs. 3, 4, 5, and 10 comprises a base or bar $c$ laterally extended at its ends and longitudinally grooved in the bottom to engage on the V shaped ribs $b^5—b^6$ and transversely grooved as shown in Fig. 10, near its rear end to engage on the rib $b^4$ of the pivot plate. Said lateral extensions $c'—c^2$ at each end of the bar project substantially at right angles therefrom as shown in Fig. 10, and are cut away or inclined from the sides of the bar upwardly on the under side to permit the bar to rock laterally on the longitudinal rib $b^5—b^6$, the amount or amplitude of such rocking movement being determined by the angle with which the lateral members $c'—c^2$ at the ends of the bar are cut away. Projecting upwardly from the rear end of said bar C is the detent or pawl head C' which is constructed of such weight that said detent or pawl will be in unstable equilibrium when swung laterally from central position or when sprung rearwardly as shown in Figs. 4 and 5 from upright position.

Extending transversely across the slotted aperture in the base in position to lie above the bar $c$ and just back of the forward side of the upward projection C' on the detent or pawl is a bar $b^7$, integral with the base plate and which serves as a stop for the forward side of the detent. As shown also, the forward or tail end of the bar $c$ is provided with an upwardly directed knuckle $c^3$, which engages against the bar $b^7$ when the pawl is inclined normally as shown in Figs. 4 and 5.

Figure 7:
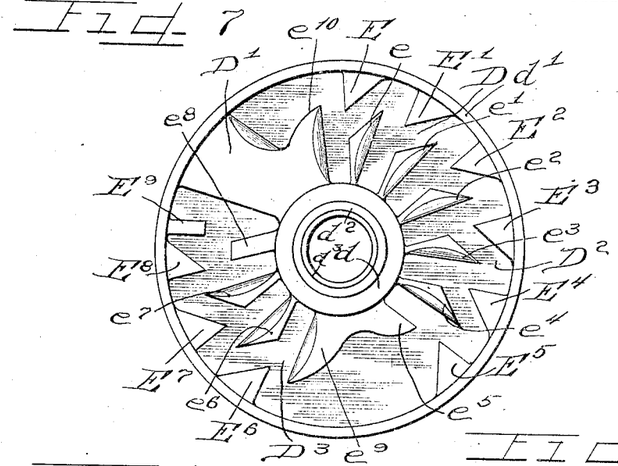
Fig. 7 is an enlarged bottom plan view of the rotatable element or cover of the regulator.

The rotatable element D comprises a rotatable circular cap of a diameter corresponding with the diameter of the base and provided with a central inwardly projecting hub $d$, which is apertured to receive the controller shaft therethrough. Said hub $d$ is reduced in diameter near its lower end affording a shoulder which rests upon a suitable fillet in the base, and the reduced portion $d^2$ of said hub projects through the aperture in said base and is further reduced in diameter below the base to receive the washer $d^4$ which engages on the said reduced extremity $d^3$ of the hub. Apertures are provided on opposite sides of said reduced extremity of the hub adapted to receive therein the inwardly directed, alined ends of the spring clip $d^5$, which is adapted to lie flat against said washer with the ends thereof engaged in said hub, thereby rotatably securing said cap on the base but permitting the removal thereof by first removing the spring clip. As shown, said washer $d^4$ is reduced in thickness on one side thereof affording a seat in which said clip may lie. Said cover is provided with an integral peripheral flange $d'$, which extends downwardly over the flange $b^3$, and the lower edge of the flange $d'$, bears on a suitable peripheral shoulder on said base affording a tight joint and rendering the casing formed by the union of the base and cap weatherproof. In the top of said cap between said hub and the peripheral flange $d'$ is provided a tortuous passage consisting of two portions $D^2—D^3$ each comprising successively connected radial channels, of a width to freely receive the top of a pawl therein and oblique channels connecting the middle of each radial channel with the outer end of the next radial channel in advance thereof, thereby necessitating successive oscillations of the pawl or detent and complete stoppage of said cover between successive advancements between oscillations. In effect said passage may be said to be formed by ratchet teeth E to $E^8$ inclusive arranged around the periphery of said cap with the advance sides thereof vertical and directed radially toward the controller shaft, and the rear sides thereof directed obliquely and outwardly to the periphery. As shown in Fig. 7, said teeth, are in two sets of six and three respectively with a considerable space between the sets though the arrangement of said teeth and the number may of course vary to suit the type of controller to which the regulator is to be applied.

Integrally connected with the hub $d$ and the inner side of the cover or cap are radially directed teeth or projections $e$ to $e^7$ inclusive. These, as shown, are arranged opposite the teeth E to $E^7$ respectively bearing the same exponent and the forward sides thereof are in radial alinement with the corresponding sides of the complemental tooth on the periphery. The outer ends of said inner teeth are directed obliquely rearward parallel with the oblique faces of the outer teeth, thus affording at each set of teeth a radial passage extending from hub to periphery and an oblique passage connecting therewith at a point intermediate the hub and periphery and extending rearwardly to the periphery. Said channel or passage throughout the length of the sections within the cap represented by the teeth E to $E^5$ and $E^6$ to $E^8$ inclusive is at all points but slightly wider than the top of the detent or pawl C′ pivotally supported upon the pivot plate as before described, except that beyond the tooth $e^5$ is an inclined outward tooth or projection $e^9$ which serves to direct the pawl or detent from the passage $D^2$ against the radial face of the tooth $E^6$ before entering the passage $D^3$. As shown, also, beyond the tooth $e^7$ is an outwardly directed rib $e^8$, the forward side of which is in alinement with the corresponding side of the tooth $E^8$ and beyond the tooth $E^8$ is an inwardly directed rib $E^9$ beyond which the passages terminate at the vertical and radial advance side of the broad web or stop D′ which limits the rotation of the rotatable element or cover and also serves when the controller shaft is at neutral position or that when the current is turned off to hold the pawl downwardly and out of engaging position, as shown in Fig. 4. As shown, integral with said web or broad stop D′ is a rearwardly and outwardly inclined projection $e^{10}$, adapted to direct said pawl against the tooth E with the preliminary movement of said cover or rotatable element in turning on the current. As shown also, said stop D′ and all the outwardly directed teeth or projections $e$ to $e^{10}$ inclusive except $e^5$ and $e^9$ are cut away or inclined forwardly on their rear sides, as shown in Fig. 7, to permit said rotatable element to be immediately returned to neutral position without necessitating the pawl traveling through said tortuous passage. As shown, a rigid integral lug F, is provided on the outer side the cover between which and an adjustable lug F′ the controller handle G, engages when secured on the controller shaft A′ and whereby said cover or rotatable element of necessity is caused to move with the controller shaft in turning on and off the current. Inasmuch as said pawl or detent C′ must traverse said tortuous passage when the current is turned on, it is obviously necessary to permit an oscillation of the pendulum, pawl or detent, radially at each of said teeth E to $E^9$ inclusive, but in turning off the current, owing to the inclined, rear sides of the teeth or projections $e$ to $e^{10}$ inclusive and the fact that the pawl can tip rearwardly said pawl is tilted rearwardly by said teeth and out of action in returning the controller shaft to neutral.

Frequently in electric car use, it occurs that it is necessary to instantly turn off the propelling current and to reverse the current to the motors immediately to permit the motor to act as a brake in emergency stops to prevent accident. Such being the case, we have provided means whereby the current may be instantly turned on in full series to reverse the motor. This is accomplished by means of a lever H. Said lever is pivotally engaged on the controller cap A at a point beneath the base B, and the inner end thereof extends beneath said base and into the slot therein, as shown in Figs. 3, 4, and 5, and the extremity $h$ thereof extends into alinement with the bar $c$, forming the base of the pawl and is inclined upwardly to engage over an upwardly and rearwardly projecting arm $C^2$, integral with said detent C′, and which is normally out of engagement with said end of the lever. When the stop or web D′ in said rotatable element engages the inclined upper end of the pawl C′ at neutral position however, said pawl is tipped rearwardly and said arm is directed downwardly into close proximity with the controller cap, and in position for the inclined end $h$ of said lever H to engage thereover when moved to reverse position, thereby holding the pawl out of action and permitting free movement of the cover and shaft in turning on reversing current. An upwardly directed horn or arm $h'$, is provided on said inner extremity of the lever in position to strike against the end of said arm $C^2$, to prevent said lever swinging beneath said arm at any time, or under any condition.

Figure 1:
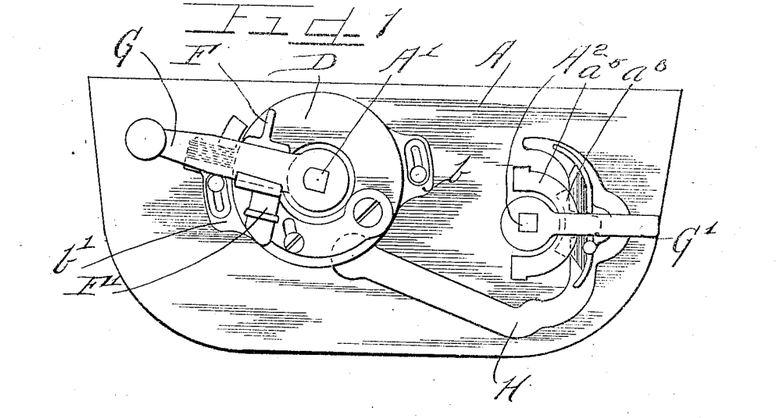
Figure 1 is a top plan view of a device embodying my invention.
Figure 2:
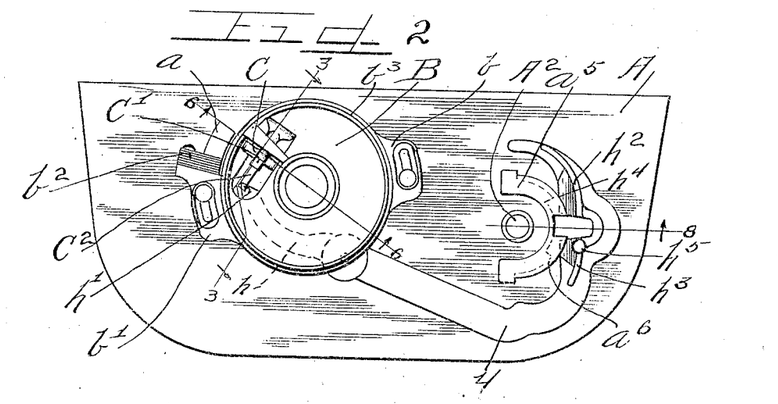
Fig. 2 is a similar view with the rotatable cover on the regulator, the controller handle and the reversing lever being omitted.

The outer end of the lever H extends around the segment $a^5$, which partly surrounds the reverse shaft $A^2$, as usual, and is provided with a forwardly extending flange $h^4$, which projects beneath the outwardly directed flange $a^6$ on said segment $a^5$, thereby preventing the end of the lever at any time being lifted when the reverse lever $G'$ is not in place. As shown, in Figs. 1, 2 and 8, said flange $h^4$ is provided with a notch corresponding with the notch in said segment $a^5$ to receive the finger detent of the reverse handle therein at neutral position. On each side said notch a flange $h^2$—$h^3$ extends upwardly affording adjacent the reverse handle stops of such height as to prevent accidental lifting of the reverse handle by the operator. The flange $h^3$ is provided adjacent the handle with an upstanding tapered projection $h^5$ which enables the flange $h^3$ to be made of less height. The shape of said lever H is such that in shifting the reverse handle forwardly to drive the motor ahead, the lever H is thrown out of engagement with the arm $C^2$ releasing the same and can only engage said arm to hold the said pawl down, when shifted to neutral and reverse position, the current, of course, first having been turned off as usual.

The operation is as follows: The pawl is pivotally supported on the pivot plate attached to the fixed base and therefore is not movable with the rotatable element and consequently operates without any tendency whatever to centrifugal action thus obviating a very serious defect in many prior devices. Inasmuch as the pawl normally oscillates laterally and radially of the cover or rotatable element the pawl affords a succession of stops for said rotatable element when turning on the current in driving the motor ahead, it being forced to successively engage the teeth E to $E^9$ inclusive. Beginning at the position indicated in Figs. 1, 2 and 4 at which the reverse handle and the controller handle are both neutral, the pawl is tilted down by engagement with the web $D'$ thereon and the lever H is engaged over the arm $C^2$. In this position should it be desired to reverse the motor it can be quickly accomplished by drawing the reverse lever $G'$ to reverse position thus firmly engaging the arm $C^2$ to hold the pawl down as shown in Fig. 5 when the controller shaft $A'$, and rotatable element or cap D may be rotated as rapidly as the operator may desire in turning on the current, said pawl being wholly out of action because of its engagement by said lever H. Having returned the controller lever and the reverse lever to neutral, the pawl is still slightly engaged by the lever H, but shifting the reverse lever ahead preparatory to deliver current to the motor to propel ahead the arm $C^2$ is released and the weighted end of the bar $c$ tends immediately to throw the pawl upwardly against the web $D'$. As the cover D is rotated in turning on the current, the upper end of the pawl having cleared the broad web $D'$ is directed laterally by the projection $e^{10}$, against the radial vertical face of the tooth E, abruptly stopping further rotation and necessitating a slight reverse rotation of the controller shaft by the operator, the pawl being in unstable equilibrium because swung to one side by the projection $e^{10}$, now swings inwardly, the amplitude of such swing being sufficient to bring it into position to be checked by the stop or projection $e$ after which it passes into the oblique portion of the passage and is directed by the oblique faces of the projections or teeth E—$e$ against the radial face of the tooth $E'$ again immediately stopping the movement of the controller shaft and necessitating a slight reversal of the movement to release the pawl. In like manner the rotatable elements are gradually and intermittently advanced, being successively stopped, and slightly reversed to permit the oscillation of the pawl, which obviously acts as a pendulum in this respect, its amplitude of oscillation of course, depending upon the weight of the respective parts thereof, the shape of the base and its general conditions of equilibrium. Having passed through the passage $D^2$, in the same manner the projection $e^9$ directs the pawl against the radial face of the tooth $E^6$, and as before described permitting current supply to be augmented by the gradual rotation of the controller shaft. As the pawl enters the passage $D^3$, the rotation progresses intermittently gradually increasing the current until it is turned on to the fullest extent possible. When it is desirable at any time to cut off the current, the inclined faces of the teeth $e$ to $e^{10}$, inclusive and also the web $D'$ and also the fact that the pawl is not supported to resist the return movement of the cover D and shaft, permit the controller shaft and cover rotatable therewith to be instantly returned to neutral at which point the pawl is, of course, automatically swung down again to be engaged by the end of the lever H, should it be desired to instantly reverse the current in the motor.

Figure 11:
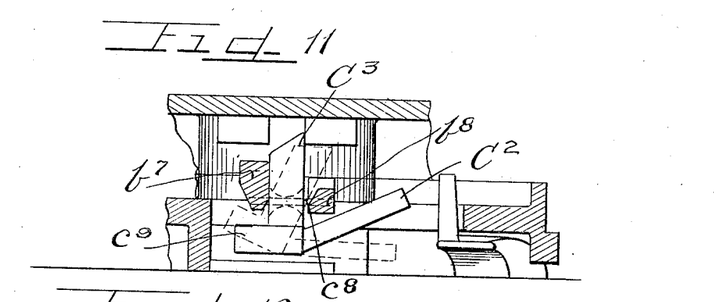
Fig. 11 is a section similar to Fig. 3 and illustrates a suspended pendulum or oscillating pawl.
Figure 12:
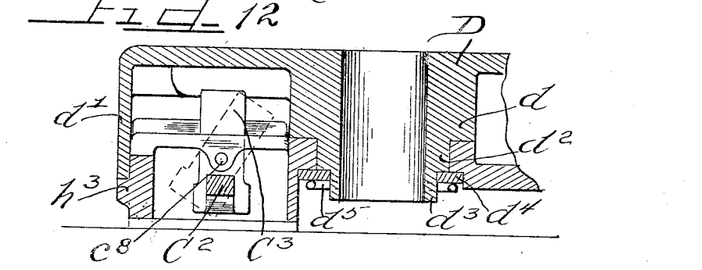
Fig. 12 is an enlarged fragmentary section similar to Fig. 6 but illustrates the suspended pawl or pendulum.

Of course, we are well aware that the detent or pawl may be supported in other ways than that shown, as for instance, a detent $C^3$ may be supported as shown in Figs. 11 and 12, that is to say, a pin or rod $c^8$ is secured in the bar or web $b^7$, and a corresponding bar $b^8$ parallel therewith and on which the detent $C^3$ swings. Said pin or rod extends through said pawl at a right angle with the radius passing from the controller shaft to the center of said pawl. The ends of said apertures or bore are flared or countersunk as shown in dotted lines in Fig. 11, to permit said detent to swing rearwardly, as shown in dotted lines in said Fig. 11, so that the arm C² thereon may be engaged by the end of the lever H. Of course, when this construction is used a forwardly extending, counterweighted base c⁹ is used to normally support the pawl in position to time or regulate the movement of the cover.

The detent may of course, be constructed in a variety of ways, and the particular form of lever adapted to hold the detent out of action when reversing may be varied.

Very many details of construction are of necessity more or less varied to suit the particular type of controller to which to be applied, and the requirements and service, and owing to the wide range of equivalent and alternative constructions that may be employed and which we have not attempted to specifically describe, we do not purpose limiting this application for patent otherwise than necessitated by the prior art.

We claim as our invention:

1. A controller regulator embracing mechanism provided with a tortuous passage, means movable in the passage acting normally to retard the turning on of propelling current but permitting instantaneously cutting off the current and means coacting with said means to hold the same out of action in turning on full reversing current.

2. A controller regulator comprising a rigid element provided with a central aperture, a rotatable element having a hub integral therewith adapted to extend through the aperture, a detachable spring member for retaining the rotatable element in place and means for intermittently retarding the rotation of said rotatable element.

3. A regulator for controllers for motors embracing means having teeth providing a passage therebetween, oscillating means adapted to engage in the passage acting to retard the turning on of propelling current and permitting of instantaneously cutting off the current, a reverse mechanism and means operated by the reverse mechanism adapted to hold the oscillating means out of action in turning on reversing current.

4. A timing device comprising a rigid base, a rotatable element and a non-rotatable retarding element adapted to move radially of the rotatable element to block rotation thereof and adapting the rotatable element to rotate between radial movements thereof.

5. A regulator for the purpose specified embracing mechanism having radial passages, means adapted to swing into each passage acting to retard the turning on of current to drive a motor in one direction and means acting to hold said retarding mechanism out of action in turning on full reversing current.

6. A regulator of the class described embracing a stationary base, an oscillating retarding member supported thereon, rotatable means adapted to engage the oscillating member and retarded in turning on of current to drive a motor in one direction and a lever acting automatically to hold said retarding mechanism out of action in turning on full reversing current.

7. A timing element comprising a stationary base, a pawl pivotally supported in the base adapted to rock radially and rotatable means for rocking the pawl and advancing after the pawl has rocked a suitable number of times.

8. A timing element comprising a rigid base, a pawl, means whereby the pawl is supported in unstable equilibrium and a rotatable cover unconnected with the pawl adapted by rotation to actuate the pawl, said pawl adapted to intermittently permit the cover to rotate.

9. In a regulating mechanism for electrical controllers the controller shaft, a pawl, a plate having a tortuous passage therein for the pawl, one of said elements secured on the shaft, the other stationary and means holding said elements out of engagement in reversing current in the motor controlled.

10. A timing element comprising a base, a cover thereon and coacting elements for retarding rotation of the cover, one supported in unstable equilibrium and the other element providing a tortuous passage.

11. In a device of the class described a rigid member, a rotatable member, a pawl inclosed by said members, means integral with the rotatable member for engagement by the pawl adapting the cover to intermittently rotate, and coacting elements, one connected with the pawl and the other adapted to engage said element to adjust the pawl to permit the cover to continuously rotate.

12. In a regulating mechanism for electrical controllers a rotatable element connected with the controller shaft provided with a passage, a non-rotatable element secured on the controller and adapted to oscillate across said passage in the rotatable element to retard turning on of current and means separating said elements in reversing thereby permitting reversing current to be instantaneously turned on and without retardation.

13. In a regulator for electrical controllers embracing a stationary base, surrounding the controller shaft, a cover therefor movable with the shaft, a pawl on one adapted to engage stops on the other to retard the turning on of current and mechanism operated by the reverse handle adapted to hold said pawl out of action and permitting the reversing current to be turned on without retardation.

14. A regulator for controllers embracing a pawl, an arm secured thereto, rotatable means for engaging the pawl and mechanism operated by the reverse handle acting to engage said arm to throw said pawl out of action in reversing.

15. A controller regulator consisting of a base, a rotatable element, a pawl supported to rock radially, a bar limiting the rocking movement of the pawl in each direction, a passage in the cover in which the pawl normally engages, and means for adjusting the pawl out of the passage.

16. In a regulator for electrical controllers for car motors a stationary base surrounding the controller shaft, a cover therefor movable with the shaft, a pawl secured on the one and projections on the other adapted by mutual engagement to retard the turning on of current, a reverse handle on the controller and mechanism operated by reverse handle adapted to hold said retarding elements out of action whereby full reversing current may be delivered to the motor instantly.

17. A regulator for electrical car motor controllers embracing a stationary base surrounding the controller shaft, a cover therefor rotatably secured to the base and movable with said shaft, a pawl pivoted on the base and adapted to successively engage radial projections in the cover to retard the turning on of maximum current to propel the car ahead, a reverse handle and a lever operated thereby in reversing adapted to hold said pawl from engagement with the cover whereby full reversing current may be instantly turned on to the motors.

18. A regulator for electrical car motor controllers embracing a stationary base surrounding the controller shaft, a cover therefor movable with said shafts, an upstanding pawl pivoted on the base and normally adapted to engage projections on the cover to retard the increase of current to the motors, a reverse handle and operative means actuated thereby adapted to hold said pawl out of action when reversing.

19. A regulator for electrical car motor controllers embracing a pawl pivotally supported adjacent the controller shaft, an element rotatable with the shaft and having a tortuous passage therein to receive the pawl, said passage affording abrupt bends at which the pawl holds the shaft from rotation to retard the turning on of current, a reverse handle and lever actuated thereby in reversing to hold said pawl out of engagement with said rotative element whereby maximum reversing current may be instantly delivered to the motor.

20. A controller regulator embracing a base, a pivot plate, ribs integral therewith, a pawl on the pivot plate notched to receive the ribs, a cover and teeth integral therewith providing passages therebetween.

21. A controller regulator embracing a base, a pivot plate, ribs integral therewith, a pawl on the pivot plate notched to receive the ribs, a cover, teeth integral therewith providing passages therebetween, an extension integral with the pawl and a lever extending at one end through a slot in the base adapted to engage the extension to adjust the pawl out of operative position.

22. A controller regulator embracing means for retarding the turning on of propelling current, a reverse mechanism, a lever operated by movement of the reverse handle for adjusting the retarding means out of operative position and coacting means on the lever and reverse mechanism for preventing removal of the lever.

23. In a controller regulator of the class described an upstanding oscillating pawl, an element rotatable with the controller shaft adapted to be intermittently engaged by the pawl to retard its rotation in normally turning on the current and mechanism actuated by the reverse handle acting to hold said pawl out of action to permit of instantaneously turning on maximum reversing current.

24. A controller regulator comprising a base, a rotatable cover thereon, coacting mechanisms for retarding rotation of said cover, a lever for adjusting one of said mechanisms out of operative position, a reversing mechanism, a notched segment, a flange integral therewith, a flange integral with the lever adapted to engage beneath the aforesaid flange to prevent removal of the lever, and means for preventing accidental removal of the reversing handle.

25. In a device of the class described the combination with a controller regulator, of means for adjusting the controlling elements of the controller regulator out of operative position, a reversing mechanism, a handle for operating the same and to simultaneously operate the aforesaid means, means for preventing removal of the aforesaid means and means for preventing accidental removal of the handle.

26. In a controller regulator a base, a rotatable cover provided with a tortuous passage, a vertical pawl pivotally supported to move in the passage, oppositely directed extensions integral with the pawl, a stop for engaging one of the extensions and mechanism for engaging the opposite extension to adjust the pawl out of the passage.

27. In a controller regulator of the class described a detent adapted to oscillate radially and at an angle with the radius to retard the rotation of the controller shaft in normally turning on the current and a lever operated by the reverse handle acting to shift said detent out of action to permit instantaneous application of maximum reversing current.

28. In a controller regulator a base, an oscillating member resting thereon, a rotatable member and teeth integral therewith adapted to successively engage the oscillating member.

29. In a controller regulator a base, a pawl resting thereon, and a rotatable member having radial passages, into each of which the pawl must swing before each advancement of the rotatable element.

30. In a controller regulator a base, a pawl resting thereon, a rotatable member having radial passages into each of which the pawl must swing before each advancement of the rotatable element and a passage affording communication between the radial passages into which the pawl is adapted to pass.

31. In a device of the class described coacting retarding elements, an extension integral with one of the same and means adapted to engage said extension to shift one retarding element out of engagement with the other.

32. In a controller regulator a rigid element, a pivot plate secured thereto, a pawl resting thereon and a rotatable member adapted to rock said pawl back and forth to successively block rotation of the rotatable member.

33. In a device of the class described a fixed element, a pivot plate secured thereto, a counterbalanced pawl supported by said pivot plate and a rotatable member adapted to rock said pawl on its pivot to successively block rotation thereof.

34. In a device of the class described a fixed element, a pivot plate secured thereto, a counterbalanced pawl supported by said pivot plate, a rotatable member adapted to rock said pawl on its pivot to successively block rotation thereof, an extension secured to the pawl and means adapted to engage said extension to throw said pawl out of operative position.

35. In a controller regulator a radially oscillatable pendulum, a rotatable element and teeth integral therewith having corresponding sides abrupt and the opposite corresponding sides inclined, said teeth adapted to engage the pendulum to cause intermittent movement of the rotatable element in one direction and said teeth adapted to pass over the pendulum when the rotatable element is moved oppositely.

In testimony whereof we have hereunto subscribed our names in the presence of two subscribing witnesses.

WILLIAM P. COSPER.
WALTER J. O. JOHNSON.

Witnesses:
K. E. HANNAH,
LAWRENCE REIBSTEIN.